United States Patent
Ojika et al.

(10) Patent No.: US 11,936,304 B2
(45) Date of Patent: Mar. 19, 2024

(54) DC/DC CONVERTER CIRCUIT AND ELECTRIC PROPULSION POWER SOURCE

(71) Applicant: Mitsubishi Electric Corporation, Tokyo (JP)

(72) Inventors: Satoshi Ojika, Tokyo (JP); Tomokazu Sakashita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 668 days.

(21) Appl. No.: 17/049,583

(22) PCT Filed: Jun. 14, 2018

(86) PCT No.: PCT/JP2018/022760
§ 371 (c)(1),
(2) Date: Oct. 22, 2020

(87) PCT Pub. No.: WO2019/239547
PCT Pub. Date: Dec. 19, 2019

(65) Prior Publication Data
US 2021/0249965 A1    Aug. 12, 2021

(51) Int. Cl.
*H02M 3/335* (2006.01)
*F03H 1/00* (2006.01)
*H02M 1/00* (2006.01)

(52) U.S. Cl.
CPC .......... *H02M 3/33592* (2013.01); *F03H 1/00* (2013.01); *H02M 1/0054* (2021.05); *H02M 3/33584* (2013.01)

(58) Field of Classification Search
CPC ............ H02M 3/22; H02M 1/08; H02M 1/36; H02M 3/24; H02M 3/325; H02M 3/335;
(Continued)

(56) References Cited

U.S. PATENT DOCUMENTS 3,612,839 A * 10/1971 DeWitt ................. G01N 23/16
  702/81
8,780,585 B2 * 7/2014 Ye ......................... H02M 3/285
  363/17
(Continued)

FOREIGN PATENT DOCUMENTS

| JP | 10-323034 A | 12/1998 |
| JP | 2012-239341 A | 12/2012 |
| JP | 2017-502638 A | 1/2017 |

OTHER PUBLICATIONS

Nijaz et al., "DC/DC Converter with Extended Range of Output Power", 2003, IEEE, pp. 652-656 (Year: 2003).*
(Continued)

*Primary Examiner* — Jeffrey A Gblende
(74) *Attorney, Agent, or Firm* — XSENSUS LLP

(57) ABSTRACT

The DC/DC converter circuit includes: a primary-side circuit configured to convert DC power from a DC power source into a pulse voltage; an isolation transformer configured to transform the pulse voltage while isolating the pulse voltage; a secondary-side circuit connectable in a switching manner by a switching circuit to one of a rectifier circuit for a high-voltage low-current output mode or a current doubler circuit for a low-voltage high-current output mode; and a control circuit configured to perform connection switching control of the switching circuit so as to establish, depending on target supply power, connection to the rectifier circuit in the high-voltage low-current output mode, and connection to the current doubler circuit in the low-voltage high-current output mode.

9 Claims, 7 Drawing Sheets

(58) Field of Classification Search
CPC ...... H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; Y02B 70/1491

See application file for complete search history.

(56) References Cited

U.S. PATENT DOCUMENTS

| | | | |
|---|---|---|---|
| 10,079,510 | B2 | 9/2018 | Boys et al. |
| 10,516,337 | B2 * | 12/2019 | Ojika ............... H02M 3/155 |
| 10,778,038 | B2 | 9/2020 | Boys et al. |
| 2014/0268903 | A1 | 9/2014 | Reiter et al. |
| 2016/0368624 | A1 | 12/2016 | Hruby et al. |

OTHER PUBLICATIONS

Communication pursuant to Article 94(3) EPC, dated Jun. 24, 2022, in corresponding European Patent Application No. 18 922 572.5.
Leiter Hans J et al: "Development and Performance of the Advanced Radio Frequency Ion Thruster RIT-XT", Feb. 21, 2003 (Feb. 21, 2003), XP055932962, Retrieved from the Internet: URL:http://electricrocket.org/IEPC/0115-0303iepc-full.pdf [retrieved on Jun. 20, 2022].
Extended European search report dated May 7, 2021, in corresponding European patent Application No. 18922572.5, 9 pages.
Nijaz Hadimejlić et al., "DC/DC Converter With Extended Range of Output Power", Industrial Technology, 2003 IEEE International Conference On Maribor, IEEE, vol. 2, No. 10, Dec. 2003, pp. 652-656, Slovenia, XP010698877.
Ming Fu et al., "New Electrical Power Supply System for All-Electric Propulsion Spacecraft", IEEE Transactions On Aerospace and Electronic Systems, IIEEE Service Center, vol. 53, No. 5, Oct. 2017, pp. 2157-2166, XP011671015.
International Search Report and Written Opinion dated Aug. 21, 2018 for PCT/JP2018/022760 filed on Jun. 14, 2018, 7 pages including English Translation of the International Search Report.

* cited by examiner

RATIO TO MAXIMUM VALUE OF OUTPUT VOLTAGE [%]

DC/DC CONVERTER CIRCUIT AND ELECTRIC PROPULSION POWER SOURCE

CROSS-REFERENCE TO RELATED APPLICATION

The present application is based on PCT filing PCT/JP2018/022760, filed Jun. 14, 2018, the entire contents of which are incorporated herein by reference.

TECHNICAL FIELD

The present invention relates to a DC/DC converter circuit configured to convert a DC voltage at a time when DC power is supplied from a DC power source, and to an electric propulsion power source.

BACKGROUND ART

In the related art, to an artificial satellite and other spacecraft, an electric thruster configured to obtain thrust using electric energy is mounted. As compared to a chemical thruster configured to obtain thrust using energy generated by chemical reaction of a propellant, the electric thruster can reduce a used amount of propellant with the use of the electric energy. Therefore, when the electric thruster is used, the spacecraft can be downsized and reduced in weight.

A Hall thruster, which is an example applied to the electric thruster, is configured to obtain thrust by accelerating, with electric energy, a propellant that has turned into plasma. In order for the Hall thruster to operate, an anode power source as a main power source is configured to apply a voltage between an anode and a cathode to supply electric power. The voltage of the anode power source is often different from a power supply voltage provided to the spacecraft. Therefore, an ability to vary the voltage depending on an operating point is required of the anode power source. Consequently, a DC/DC converter circuit is used in the anode power source.

Further, in the Hall thruster, a potential difference occurs between the cathode as a reference potential of a load and a satellite structure, and hence a non-isolated DC/DC converter circuit cannot be used. Therefore, an isolated DC/DC converter circuit is used.

In an isolated DC/DC converter circuit according to the related art, DC power from a DC power source is converted into a pulse voltage by an inverter circuit of a primary-side circuit, and the pulse voltage is isolated and transformed by an isolation transformer. Thereafter, isolation and voltage conversion are performed by rectifying the transformed pulse voltage by a plurality of rectifier elements of a rectifier circuit, and smoothing the rectified voltage by a smoothing inductor and a smoothing capacitor of a smoothing circuit.

In an artificial satellite in the related art, during station keeping (SK) in which small thrust is required, the Hall thruster is used. However, in order to downsize and reduce the weight of the artificial satellite, there is a method called "complete electric propulsion", in which electric propulsion is used also during orbit raising (OR). Characteristics required in respective modes of the station keeping and the orbit raising are different.

Specifically speaking, in the orbit raising mode, in order to complete orbit transition swiftly, it is required to output large thrust with limited electric power. In contrast, in the station keeping mode, although small thrust suffices, an efficient operation with a small consumption of propellant is required. An anode current value of the anode power source is substantially proportional to a propellant flow rate. Therefore, a low voltage and a high current are required in the orbit raising mode, and a high voltage and a low current are required in the station keeping mode.

Incidentally, it is required to design such an isolated DC/DC converter having the low-voltage high-current operating point and the high-voltage low-current operating point so that a maximum output voltage can be output. As a result, a duty is reduced at the time of the low-voltage high-current output, and element utilization is disadvantageously reduced. This is accompanied by increased values of electric currents flowing through the components, as well as an increase in loss. Therefore, problems of a reduction in power conversion efficiency and an increased amount of heat generation result.

As a technology of solving the above-mentioned problems, there is proposed, as a high efficiency and large output power supply, a synchronous double-current power supply in which a secondary side rectification circuit is controlled to be synchronized with a primary side full bridge circuit (see, for example, Patent Literature 1).

With the technology according to Patent Literature 1, a current doubler circuit is formed for the synchronous double-current power supply. Therefore, an electric current to flow through an isolation transformer and an electric current to flow through a single inductor can be reduced to ½ of an output current. As a result, the loss during the low-voltage high-current output can be reduced.

CITATION LIST

Patent Literature

[PTL 1] JP 3477029 B

SUMMARY OF INVENTION

Technical Problem

However, the current doubler circuit has a problem in that, while the loss during the low-voltage high-current output can be reduced, a maximum value of an output voltage is also halved, and hence that a high voltage cannot be output. Further, with the current doubler circuit, an inductor ripple current is maximized when the maximum voltage is output. Therefore, the current doubler circuit is unsuitable for a high-voltage low-current output operation. To address this problem, when the current doubler circuit is designed so as to increase the maximum output voltage, it is required to double the number of turns of a secondary winding of an isolation transformer. In such a case, there occur problems that a winding resistance is increased, and that the loss during the low-voltage high-current output is increased.

As described above, in the related-art technology, it is difficult to achieve high efficiency both during the low-voltage high-current output and during the high-voltage low-current output.

The present invention has been made to solve the above-mentioned problems, and therefore has an object to provide a DC/DC converter circuit, which is capable of achieving high efficiency both during low-voltage high-current output and during high-voltage low-current output, and an electric propulsion power source.

Solution to Problem

In order to achieve the above-mentioned object, a DC/DC converter circuit according to the present invention includes:

a primary-side circuit configured to convert DC power from a DC power source into a pulse voltage; an isolation transformer configured to transform the pulse voltage while isolating the pulse voltage; a secondary-side circuit connectable in a switching manner by a switching circuit to one of a rectifier circuit for a high-voltage low-current output mode or a current doubler circuit for a low-voltage high-current output mode; and a control circuit configured to perform connection switching control of the switching circuit so as to establish, depending on target supply power, connection to the rectifier circuit in the high-voltage low-current output mode, and connection to the current doubler circuit in the low-voltage high-current output mode.

Advantageous Effects of Invention

According to the present invention, with the above-mentioned configuration, it is possible to achieve the high efficiency both during the low-voltage high-current output and during the high-voltage low-current output.

DESCRIPTION OF EMBODIMENTS

Figure 1:
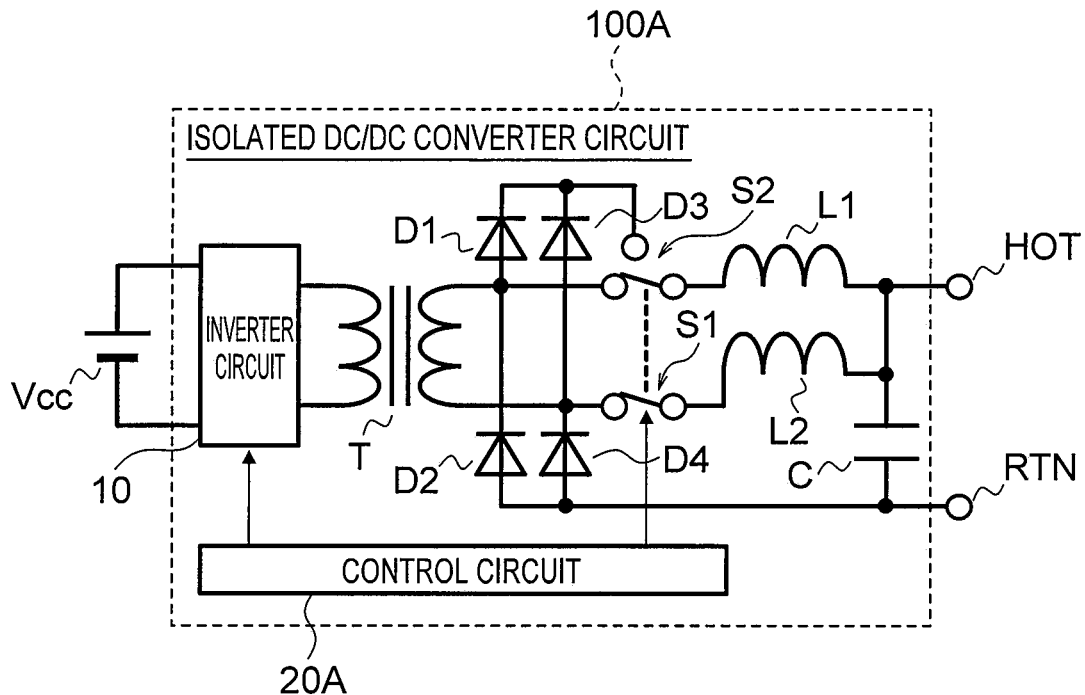
FIG. 1 is a circuit diagram for illustrating a basic configuration of an isolated DC/DC converter circuit according to a first embodiment of the present invention.

Referring to the drawings, a DC/DC converter circuit and an electric propulsion power source according to embodiments of the present invention are described in detail below.

Figure 13:
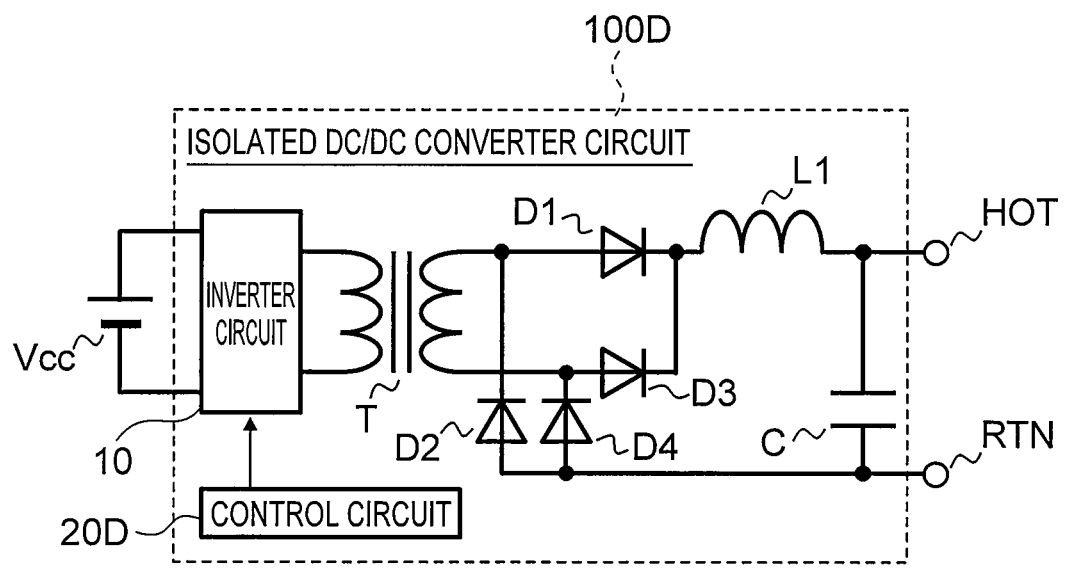
FIG. 13 is a circuit diagram for illustrating a basic configuration of an isolated DC/DC converter circuit according to the related art.

First, in order to facilitate understanding of the present invention, a DC/DC converter circuit according to the related art is described. FIG. 13 is a circuit diagram for illustrating a basic configuration of an isolated DC/DC converter circuit 100D according to the related art.

Referring to FIG. 13, the isolated DC/DC converter circuit 100D is configured to, as a basic function, be supplied with DC power from an external DC power source Vcc, convert a voltage while isolating the voltage, and supply DC power to output terminals HOT and RTN. In the isolated DC/DC converter circuit 100D, the DC power from the DC power source Vcc is converted into a pulse voltage by an inverter circuit 10 under control of a control circuit 20D. Further, in the isolated DC/DC converter circuit 100D, the pulse voltage is transformed while isolating the pulse voltage by an isolation transformer T.

The transformed pulse voltage is rectified by the first to fourth rectifier elements D1 to D4 forming a rectifier circuit, and then the rectified voltage is smoothed by a smoothing inductor L1 and a smoothing capacitor C forming a smoothing circuit. As a result, the isolation and the voltage conversion are performed, and the voltage-converted DC power is supplied to the output terminals HOT and RTN, to which a load is connected. The output terminal HOT corresponds to a first output terminal, and the output terminal RTN corresponds to a second output terminal, which similarly applies to the following description.

In the isolated DC/DC converter circuit 100D, the inverter circuit 10 has an output terminal connected to a primary winding of the isolation transformer T, and an input terminal connected to the DC power source Vcc. Such a configuration of the inverter circuit 10 corresponds to a primary-side circuit, Further, a configuration including the rectifier circuit formed of the rectifier elements D1 to D4 connected to a secondary winding of the isolation transformer T, the smoothing circuit formed of the smoothing inductor L1 and the smoothing capacitor C, and the output terminals HOT and RTN corresponds to a secondary-side circuit.

In the isolated DC/DC converter circuit 100D, a duty is reduced during low-voltage output, and an output current passes through any one of the first to fourth rectifier elements D1 to D4 twice. As a result, a ratio of conduction loss to output power is high. Therefore, there is a problem that a reduction in power conversion efficiency is inevitable. To address this problem, an isolated DC/DC converter circuit according to the present invention has an object of achieving high efficiency both during low-voltage high-current output and during high-voltage low-current output.

A technical overview of the isolated DC/DC converter circuit according to the present invention is first described. The isolated DC/DC converter circuit according to the present invention includes a primary-side circuit configured to convert DC power from a DC power source into a pulse voltage, and an isolation transformer configured to transform the pulse voltage while isolating the pulse voltage. The isolated DC/DC converter circuit according to the present invention also includes a secondary-side circuit connectable in a switching manner by a switching circuit to one of a rectifier circuit for a high-voltage low-current output mode and a current doubler circuit for a low-voltage high-current output mode. The isolated DC/DC converter circuit according to the present invention further includes a control circuit configured to perform connection switching control of the switching circuit so as to connect a switch to the rectifier circuit in the high-voltage low-current output mode, and connect the switch to the current doubler circuit in the low-voltage high-current output mode depending on target supply power.

In the DC/DC converter circuit according to the present invention, the control circuit is configured to determine that the DC/DC converter circuit is in the high-voltage low-current output mode and connect the switch in the switching manner to the rectifier circuit when the target supply power is equal to or higher than ½ of a maximum output voltage. The control circuit is also configured to determine that the DC/DC converter circuit is in the low-voltage high-current output mode and connect the switch in the switching manner to the current doubler circuit when the target supply power is lower than ½ of the maximum output voltage. As a result, in the low-voltage high-current output mode, a duty of the primary-side circuit is increased to twice as much as that in the high-voltage low-current output mode, and electric currents to flow through the primary-side circuit and the isolation transformer are reduced to ½. Consequently, the above-mentioned object is achieved. Now, exemplary embodiments of the isolated DC/DC converter circuit and an electric propulsion power source according to the present invention are described below with reference to the drawings.

First Embodiment

FIG. 1 is a circuit diagram for illustrating a basic configuration of an isolated DC/DC converter circuit 100A according to a first embodiment of the present invention.

Referring to FIG. 1, the isolated DC/DC converter circuit 100A has a basic function similar to that in the related art. That is, the isolated DC/DC converter circuit 100A is configured to be supplied with the DC power from the DC power source Vcc, convert a voltage while isolating the voltage, and supply DC power to the output terminals HOT and RTN. Further, a configuration of the primary-side circuit in which the inverter circuit 10 under control of a control circuit 20A converts the DC power from the DC power source Vcc into the pulse voltage, and a configuration including the isolation transformer T configured to transform the pulse voltage while isolating the pulse voltage are also common to the related art.

The isolated DC/DC converter circuit 100A is different in configuration of the secondary-side circuit from the isolated DC/DC converter circuit 100D according to the related art. The secondary-side circuit includes the first to fourth rectifier elements D1 to D4 forming the rectifier circuit, two changeover switches S1 and S2 forming the switching circuit, smoothing inductors L1 and L2 and a smoothing capacitor C forming a smoothing circuit, which serves as the current doubler circuit.

The control circuit 20A is configured to connect the switches S1 and S2 in a switching manner to the rectifier circuit in the high-voltage low-current output mode, and connect the switches S1 and S2 in the switching manner to the current doubler circuit in the low-voltage high-current output mode depending on the target supply power. In this manner, the control circuit 20A performs connection switching control of the changeover switches S1 and S2. The changeover switch S1 corresponds to a first circuit, and the changeover switch S2 corresponds to a second circuit.

The changeover switches S1 and S2 are configured to switch electric connection, and may be each formed of any one of a mechanical switch, a mechanical relay, and a semiconductor switch, or a combination thereof, for example. For the changeover switches S1 and S2, connection positions of contact pieces illustrated in FIG. 1 are defined as first contacts. Further, connection positions obtained by switching the contact piece of the changeover switch S1 from the first contact to be opened, and by switching the contact piece of the changeover switch S2 from the first contact are defined as second contacts.

Operation with the connection positions of the first contacts illustrated in FIG. 1 is the low-voltage high-current output mode, in which a switch is made to the current doubler circuit. In contrast, operation with the connection positions of the second contacts is the high-voltage low-current output mode, in which a switch is made to the rectifier circuit.

The inverter circuit 10 is a circuit configured to output positive and negative pulse voltage waveforms, and is formed of a full-bridge circuit or a push-pull circuit, for example. The inverter circuit 10 has an input terminal connected to the DC power source Vcc, and an output terminal connected to the primary winding of the isolation transformer T.

The secondary winding of the isolation transformer T has one terminal connected to a connection point among an anode of the first rectifier element D1 and a cathode of the second rectifier element D2, which are connected in series with each other, and the first contact of the changeover switch S2. The secondary winding of the isolation transformer T has the other terminal connected to a connection point among an anode of the third rectifier element D3 and a cathode of the fourth rectifier element D4, which are connected in series with each other, and the first contact of the changeover switch S1.

The first rectifier element D1 and the third rectifier element D3 have cathodes connected to the second contact of the changeover switch S2. The second rectifier element D2 and the fourth rectifier element D4 have anodes connected to one end of the smoothing capacitor C and the output terminal RTN.

The changeover switches S1 and S2 have common terminals, which are indicated by dotted lines, connected to one terminals of the smoothing inductors L1 and L2, respectively. The smoothing inductors L1 and L2 each have the other terminal connected to the other end of the smoothing capacitor C and the output terminal HOT.

Figure 2:
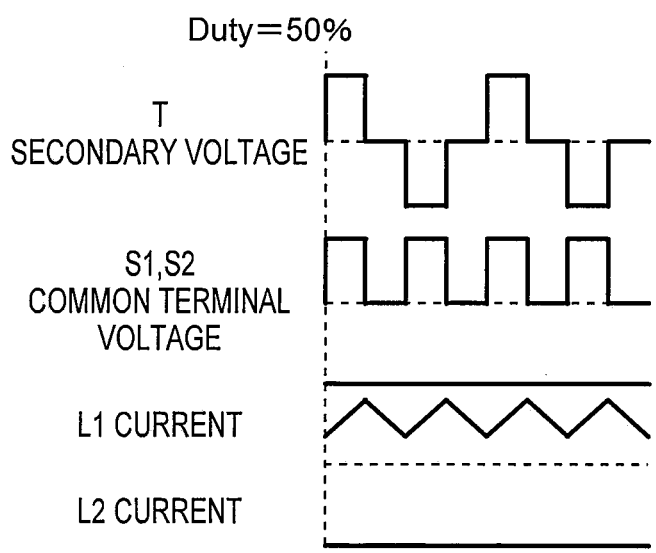
FIG. 2 is a timing chart of waveforms among devices for illustrating operation in a high-voltage low-current output mode of an inverter circuit of the isolated DC/DC converter circuit illustrated in FIG. 1 at a duty of 50%.
Figure 3:
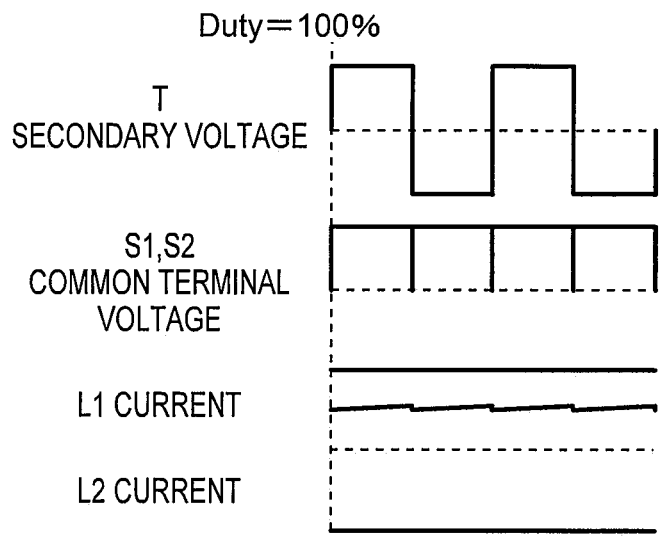
FIG. 3 is a timing chart of waveforms among the devices for illustrating operation in the high-voltage low-current output mode of the inverter circuit of the isolated DC/DC converter circuit illustrated in FIG. 1 at a duty of 100%.

FIG. 2 is a timing chart of waveforms among devices for illustrating operation in the high-voltage low-current output mode of the inverter circuit 10 of the isolated DC/DC converter circuit 100A at a duty=50%. FIG. 3 is a timing chart of waveforms among devices for illustrating operation in the high-voltage low-current output mode of the inverter circuit 10 of the isolated DC/DC converter circuit 100A at a duty=100%.

Referring to FIG. 2 and FIG. 3, in the high-voltage low-current output mode, the cathodes of the first rectifier element D1 and the third rectifier element D3 are connected to the smoothing inductor L1 via the changeover switch S2. At this time, the smoothing inductor L2 is opened, and is not involved in the circuit operation. When the isolation transformer T outputs a secondary voltage being a positive voltage, the first rectifier element D1 and the fourth rectifier element D4 are conducting. When the isolation transformer T outputs the secondary voltage being a negative voltage, the second rectifier element D2 and the third rectifier element D3 are conducting.

The secondary voltage of the isolation transformer T is full-wave rectified by the first to fourth rectifier elements D1 to D4, and a voltage having an absolute-value waveform appears between the cathodes of the first rectifier element D1 and the third rectifier element D3 and the anodes of the second rectifier element D2 and the fourth rectifier element D4. This voltage is smoothed by the smoothing inductor L1 and the smoothing capacitor C, and the DC power is supplied between the output terminals HOT and RTN. A DC voltage output when this DC power is supplied is theoretically Vcc·Duty·n when a turn ratio of the isolation transformer T is 1:n. The DC voltage to be actually output is lower than the theoretical value due to losses in the respective parts. An average value of an amplitude of an electric current to flow through the secondary winding of the isolation transformer T is equal to the output current.

Figure 4:
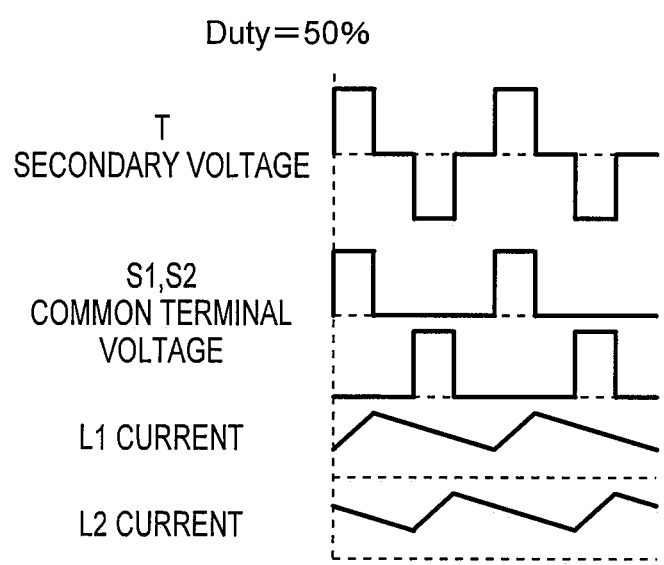
FIG. 4 is a timing chart of waveforms among the devices for illustrating operation in a low-voltage high-current output mode of the inverter circuit of the isolated DC/DC converter circuit illustrated in FIG. 1 at a duty of 50%.
Figure 5:
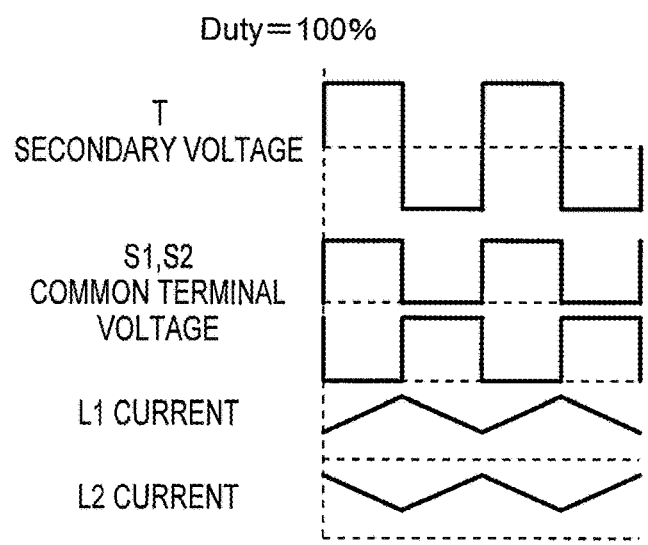
FIG. 5 is a timing chart of waveforms among the devices for illustrating operation in the low-voltage high-current output mode of the inverter circuit of the isolated DC/DC converter circuit illustrated in FIG. 1 at a duty of 100%.

FIG. 4 is a timing chart of waveforms among devices for illustrating operation in the low-voltage high-current output mode of the inverter circuit 10 of the isolated DC/DC converter circuit 100A at a duty=50%. FIG. 5 is a timing chart of waveforms among devices for illustrating operation in the low-voltage high-current output mode of the inverter circuit 10 of the isolated DC/DC converter circuit 100A at a duty=100%.

Referring to FIG. 4 and FIG. 5, in the low-voltage high-current output mode, the cathodes of the first rectifier element D1 and the third rectifier element D3 are opened, and are not involved in the circuit operation. When the isolation transformer T outputs a positive voltage, the fourth rectifier element D4 is conducting. When the isolation transformer T outputs a negative voltage, the second rectifier element D2 is conducting.

As a result, as illustrated in FIG. 4, at a first common terminal of the changeover switch S1, a voltage generated by a positive half wave of the voltage of the isolation transformer T appears. In contrast, at a second common terminal of the changeover switch S2, a voltage obtained by inverting a negative half wave of the voltage of the isolation transformer T appears. Those voltage waveforms are applied to the one of terminals of the smoothing inductors L1 and L2, and a current having a shape obtained by superimposing a triangular wave on a direct current flows.

To the smoothing inductors L1 and L2, a voltage waveform with the duty being halved is applied. Through each of the smoothing inductors L1 and L2, an average current having the same amplitude as the electric current of the isolation transformer T flows. The DC power is supplied between the output terminals HOT and RTN under the above-mentioned state. The DC voltage output when the DC power is supplied is ½ of that in the high-voltage low-current output mode, and is theoretically Vcc·Duty·n/2 when the turn ratio of the isolation transformer T is 1:n.

The DC voltage to be actually output is lower than the theoretical value due to the losses in the respective parts. The average value of the amplitude of the electric current to flow through the secondary side of the isolation transformer T is ½ of the output current. Therefore, an electric current that is twice as large as that in the high-voltage low-current output mode can be output.

In the isolated DC/DC converter circuit 100D according to the related art illustrated in FIG. 13, as described above, the ratio of the conduction loss to the output power is high during the low-voltage output, and hence the reduction in power conversion efficiency has been inevitable. In contrast, with the isolated DC/DC converter circuit 100A according to the first embodiment, when in use in the low-voltage high-current output mode, the duty is increased to twice as high as that in the related art. Further, when in use in the low-voltage high-current output mode, the output current passes through any one of the second rectifier element D2 and the fourth rectifier element D4 once, and the currents to flow through the respective parts (inverter circuit 10 and isolation transformer T) are halved. Therefore, power conversion efficiency during low-voltage output is improved.

Figure 6:
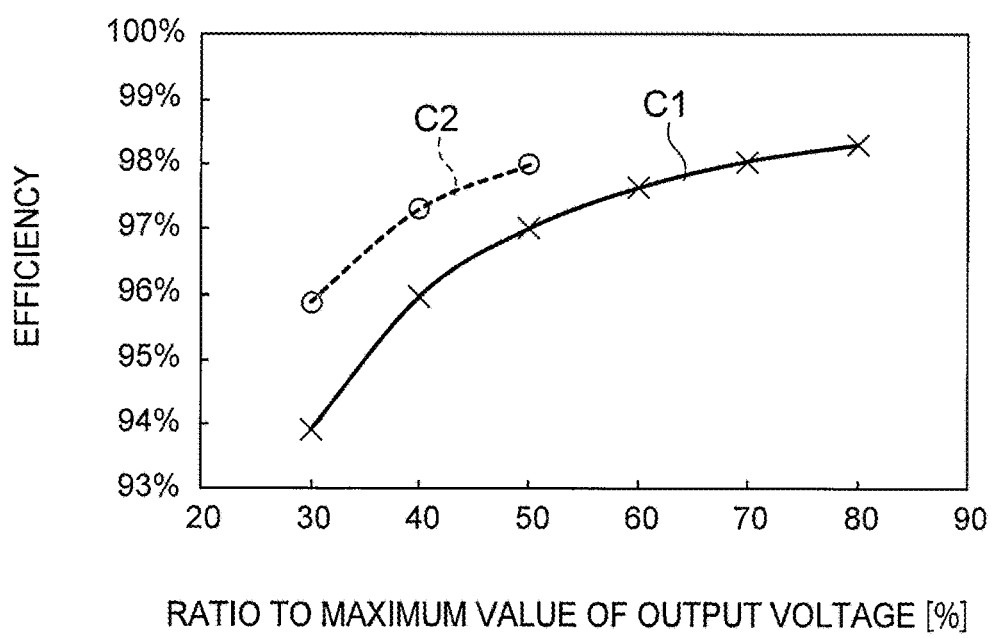
FIG. 6 is a graph for showing power conversion efficiency characteristics obtained by analysis while changing an output voltage under a condition with constant output power for the isolated DC/DC converter circuit illustrated in FIG. 1.

FIG. 6 is a graph for showing power conversion efficiency characteristics obtained by analysis while changing an output voltage under a condition with constant output power for the isolated DC/DC converter circuit 100A according to the first embodiment.

Referring to FIG. 6, a characteristic C1 indicated by the solid line is efficiency in the high-voltage low-current output mode, and is common to the case of the isolated DC/DC converter circuit 100D. In the characteristic C1, it can be seen that the power conversion efficiency is significantly reduced in a low-voltage region. In contrast, a characteristic C2 indicated by the dotted line is efficiency in the low-voltage high-current output mode of the isolated DC/DC converter circuit 100A according to the first embodiment. In other words, it can be seen that, in the low-voltage high-current output mode, with the connection being switched to the current doubler circuit, the power conversion efficiency can be significantly improved.

Second Embodiment

Figure 7:
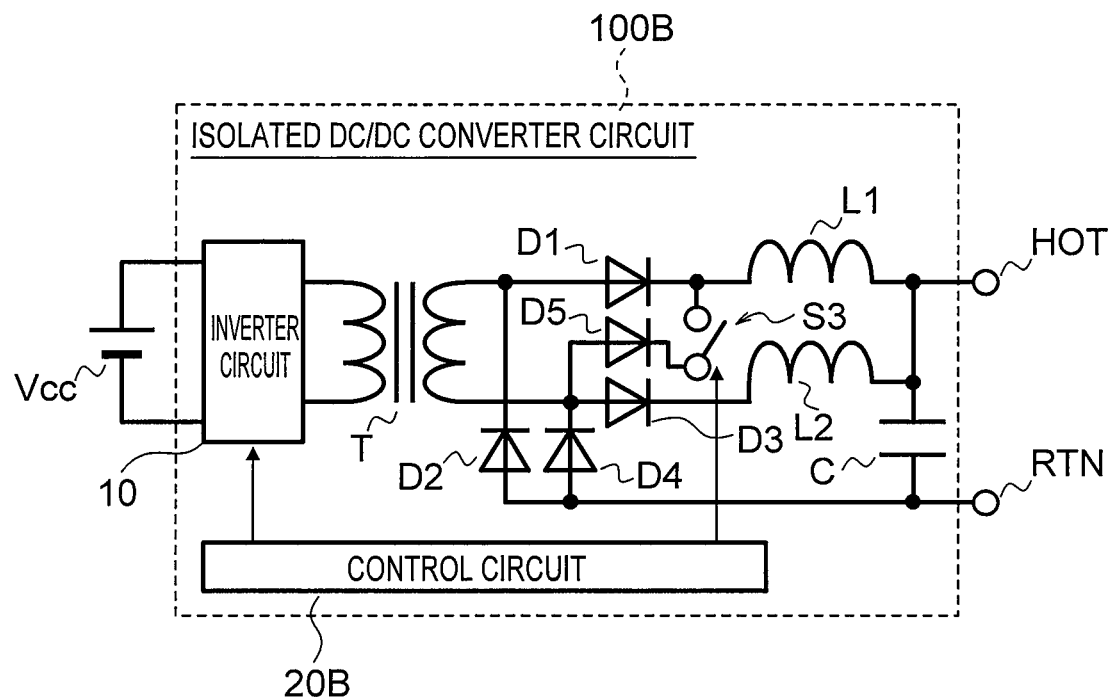
FIG. 7 is a circuit diagram for illustrating a basic configuration of an isolated DC/DC converter circuit according to a second embodiment of the present invention.

FIG. 7 is a circuit diagram for illustrating a basic configuration of an isolated DC/DC converter circuit 100B according to a second embodiment of the present invention.

Referring to FIG. 7, the isolated DC/DC converter circuit 100B has a basic function similar to that in the related art, and is configured to be supplied with the DC power from the DC power source Vcc, convert a voltage while isolating the voltage, and supply DC power to the output terminals HOT and RTN. Further, a configuration of the primary-side circuit in which the inverter circuit 10 under control of a control circuit 20B converts the DC power from the DC power source Vcc into the pulse voltage, and a configuration including the isolation transformer T configured to transform the pulse voltage while isolating the pulse voltage are also common to the related art.

The isolated DC/DC converter circuit 100B is different in configuration of the secondary-side circuit from the isolated DC/DC converter circuit 100A according to the first embodiment described above. The secondary-side circuit includes the first to fifth rectifier elements D1 to D5 forming the rectifier circuit, a changeover switch S3 forming the switching circuit, the smoothing inductors L1 and L2 and the smoothing capacitor C forming the smoothing circuit, which serves as the current doubler circuit.

The control circuit 20B is configured to connect the switch S3 in a switching manner to the rectifier circuit in the high-voltage low-current output mode, and connect the switch S3 in the switching manner to the current doubler circuit in the low-voltage high-current output mode depending on the target supply power. In this manner, the control circuit 20B performs connection switching control of the changeover switch S3.

The changeover switch S3 is configured to switch electric connection, and may be each formed of any one of a mechanical switch, a mechanical relay, and a semiconductor switch, or a combination thereof, for example. For the changeover switch S3, operation in a state in which a contact piece is opened, which is illustrated in FIG. 7, is the low-voltage high-current output mode, in which the connection is switched to the current doubler circuit. Further, operation in a state in which the contact piece of the changeover switch S3 is connected is the high-voltage low-current output mode, in which the connection is switched to the rectifier circuit.

The inverter circuit 10 is a circuit configured to output positive and negative pulse voltage waveforms, and is formed of a full-bridge circuit or a push-pull circuit, for example. The inverter circuit 10 has an input terminal connected to the DC power source Vcc, and an output terminal connected to the primary winding of the isolation transformer T.

The secondary winding of the isolation transformer T has one terminal connected to an anode of the first rectifier element D1 and a cathode of the second rectifier element D2, which are connected in series with each other. The secondary winding of the isolation transformer T has the other terminal connected to an anode of the third rectifier element D3, a cathode of the fourth rectifier element D4, and an anode of the fifth rectifier element D5, which are connected in series with each other. The changeover switch S3 is inserted between the cathode of the first rectifier element D1 and a cathode of the fifth rectifier element D5.

The second rectifier element D2 and the fourth rectifier element D4 have anodes connected to one end of the smoothing capacitor C and the output terminal RTN. The first rectifier element D1 and the third rectifier element D3 have cathodes connected to one terminals of the smoothing inductors L1 and L2, respectively. The smoothing inductors L1 and L2 each have the other terminal connected to the other end of the smoothing capacitor C and the output terminal HOT.

Figure 8:
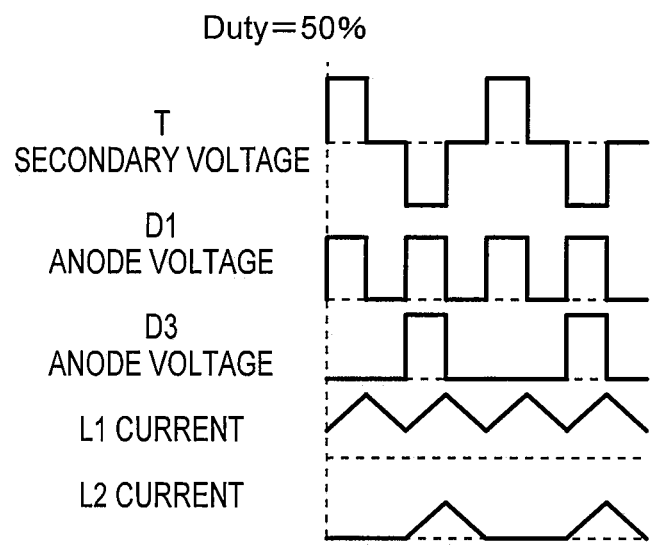
FIG. 8 is a timing chart of waveforms among devices for illustrating operation in a high-voltage low-current output mode of an inverter circuit of the isolated DC/DC converter circuit illustrated in FIG. 7 at a duty of 50%.
Figure 9:
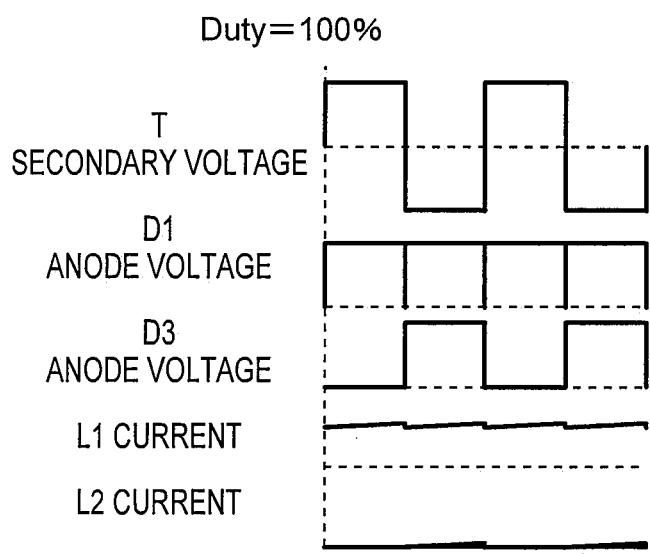
FIG. 9 is a timing chart of waveforms among devices for illustrating operation in the high-voltage low-current output mode of the inverter circuit of the isolated DC/DC converter circuit illustrated in FIG. 7 at a duty of 100%.

FIG. 8 is a timing chart of waveforms among devices for illustrating operation in the high-voltage low-current output mode of the inverter circuit 10 of the isolated DC/DC converter circuit 100B at a duty=50%. FIG. 9 is a timing chart of waveforms among devices for illustrating operation in the high-voltage low-current output mode of the inverter circuit 10 of the isolated DC/DC converter circuit 100B at a duty=100%.

Referring to FIG. 8 and FIG. 9, in the high-voltage low-current output mode, to the smoothing inductor L1, the cathode of the first rectifier element D1 is connected, and the cathode of the fifth rectifier element D5 is connected via the changeover switch S3. At this time, the cathode of the third rectifier element D3 is connected to the smoothing inductor L2. When the isolation transformer T outputs the secondary voltage being a positive voltage, the first rectifier element D1 and the fourth rectifier element D4 are conducting. When the isolation transformer T outputs the secondary voltage being a negative voltage, the second rectifier element D2, the third rectifier element D3, and the fifth rectifier element D5 are conducting.

The secondary voltage of the isolation transformer T is full-wave rectified by the first rectifier element D1, the second rectifier element D2, the fourth rectifier element D4, and the fifth rectifier element D5, and a voltage having an absolute-value waveform appears between the cathodes of the first rectifier element D1 and the fifth rectifier element D5 and the anodes of the second rectifier element D2 and the fourth rectifier element D4. This voltage is smoothed by the smoothing inductor L1 and the smoothing capacitor C, and the DC power is supplied between the output terminals HOT and RTN.

Further, a voltage obtained by inverting a negative half wave of the secondary voltage of the isolation transformer T is applied to the smoothing inductor L2, and an electric current that is smaller than that in the smoothing inductor L1 is supplied to the smoothing capacitor C in a current discontinuous mode. A DC voltage output when the DC power is supplied is theoretically Vcc·Duty·n when a turn ratio of the isolation transformer T is 1:n. The DC voltage to be actually output is lower than the theoretical value due to losses in the respective parts. An average value of an amplitude of an electric current to flow through the secondary winding of the isolation transformer T is equal to the output current.

Figure 10:
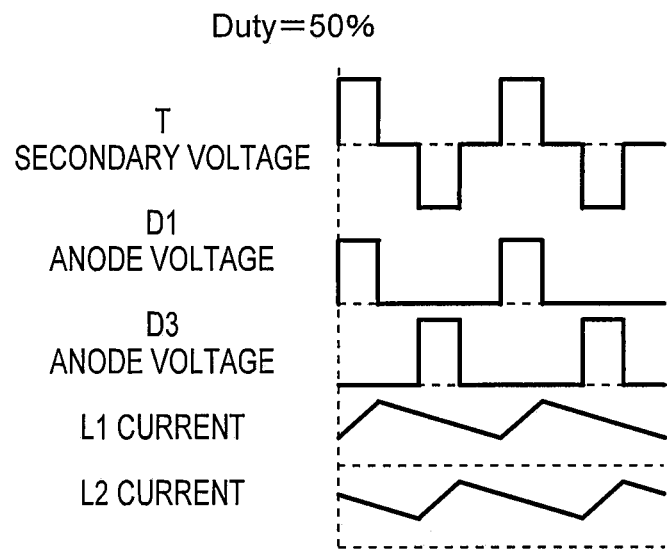
FIG. 10 is a timing chart of waveforms among devices for illustrating operation in a low-voltage high-current output mode of the inverter circuit of the isolated DC/DC converter circuit illustrated in FIG. 7 at a duty of 50%.
Figure 11:
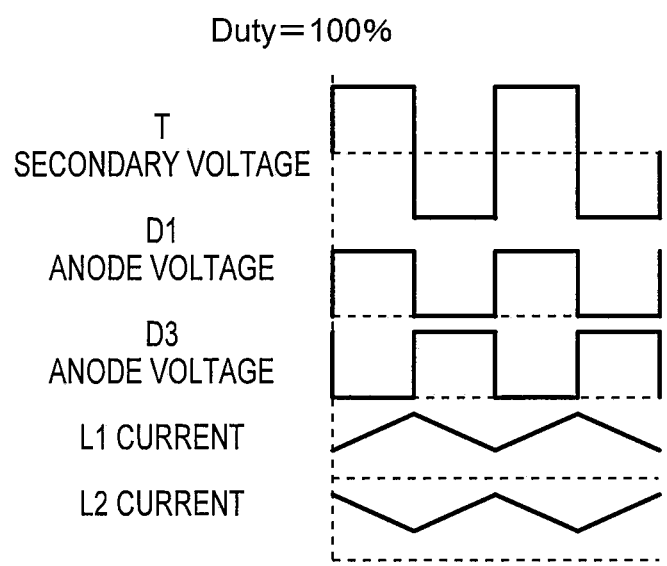
FIG. 11 is a timing chart of waveforms among devices for illustrating operation in the low-voltage high-current output mode of the inverter circuit of the isolated DC/DC converter circuit illustrated in FIG. 7 at a duty of 100%.

FIG. 10 is a timing chart of waveforms among devices for illustrating operation in the low-voltage high-current output mode of the inverter circuit 10 of the isolated DC/DC converter circuit 100B at a duty=50%. FIG. 11 is a timing chart of waveforms among devices for illustrating operation in the low-voltage high-current output mode of the inverter circuit 10 of the isolated DC/DC converter circuit 100B at a duty=100%.

Referring to FIG. 10 and FIG. 11, in the low-voltage high-current output mode, the cathode of the fifth rectifier element D5 is opened, and is not involved in the circuit operation. When the isolation transformer T outputs a positive voltage, the fourth rectifier element D4 is conducting. when the isolation transformer T outputs a negative voltage, the second rectifier element D2 is conducting. At this time, as long as electric currents flow through the smoothing inductors L1 and L2, the first rectifier element D1 and the third rectifier element D3 are always conducting.

As a result, as illustrated in FIG. 10, at the anode of the first rectifier element D1, a voltage generated by a positive half wave of the voltage of the isolation transformer T appears. In contrast, at the anode of the third rectifier element D3, a voltage obtained by inverting a negative half wave of the voltage of the isolation transformer T appears. Those voltage waveforms are applied to the one terminals of the smoothing inductors L1 and L2, and a current having a shape obtained by superimposing a triangular wave on a direct current flows.

To the smoothing inductors L1 and L2, a voltage waveform with the duty being halved is applied. Through each of the smoothing inductors L1 and L2, an average current having the same amplitude as the electric current of the isolation transformer T flows. The DC power is supplied between the output terminals HOT and RTN under the above-mentioned state. The DC voltage output when the DC power is supplied is ½ of that in the high-voltage low-current output mode, and is theoretically Vcc·Duty·n/2 when the turn ratio of the isolation transformer T is 1:n.

The DC voltage to be actually output is lower than the theoretical value due to the losses in the respective parts. The average value of the amplitude of the electric current to flow through the secondary side of the isolation transformer T is ½ of the output current. Therefore, an electric current that is twice as large as that in the high-voltage low-current output mode can be output.

In the isolated DC/DC converter circuit 100D according to the related art illustrated in FIG. 13, as described above, the ratio of the conduction loss to the output power is high during the low-voltage output, and hence the reduction in power conversion efficiency has been inevitable. In contrast, with the isolated DC/DC converter circuit 100B according to the second embodiment, when in use in the low-voltage high-current output mode, the duty is increased to twice as high as that in the related art. Further, when in use in the low-voltage high-current output mode, the currents to flow through the respective parts (inverter circuit 10 and isolation transformer T) are halved. Therefore, power conversion efficiency during low-voltage output is improved.

Third Embodiment

Figure 12:
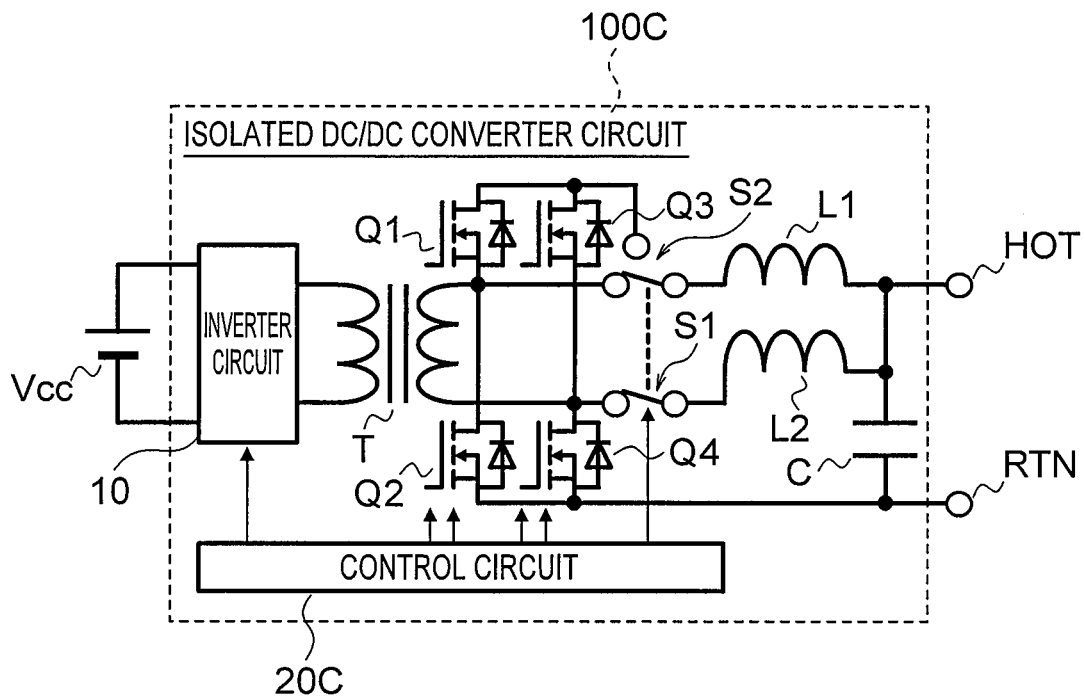
FIG. 12 is a circuit diagram for illustrating a basic configuration of an isolated DC/DC converter circuit according to a third embodiment of the present invention.

FIG. 12 is a circuit diagram for illustrating a basic configuration of an isolated DC/DC converter circuit 100C according to a third embodiment of the present invention.

Referring to FIG. 12, the isolated DC/DC converter circuit 100C has a basic function similar to that in the related art, and is configured to be supplied with the DC power from the DC power source Vcc, convert a voltage while isolating the voltage, and supply DC power to the output terminals HOT and RTN. Further, a configuration of the primary-side circuit in which the inverter circuit 10 under control of a control circuit 20C converts the DC power from the DC power source Vcc into the pulse voltage, and a configuration including the isolation transformer T configured to transform the pulse voltage while isolating the pulse voltage are also common to the related art.

The isolated DC/DC converter circuit 100C is different from the isolated DC/DC converter circuit 100A according to the first embodiment in that, as a configuration of the secondary-side circuit, the first to fourth rectifier elements D1 to D4 are replaced by the synchronous rectifier elements Q1 to Q4 each formed of, for example, a transistor.

A case in which each of the synchronous rectifier elements Q1 to Q4 in the case of FIG. 12 is a MOSFET is illustrated. The synchronous rectifier elements Q1 to Q4 may perform synchronous rectification with the use of other devices, such as BJTs, IGBTs, or FETs. Also with this isolated DC/DC converter circuit 100C, actions and effects equivalent to those obtained in the case of the isolated DC/DC converter circuit 100A according to the first embodiment described above can be obtained.

In the configuration described in each of the first to third embodiments described above, there is assumed a case in which each of the control circuits 20A, 20B, and 20C makes a switch between the high-voltage low-current output mode and the low-voltage high-current output mode based on an output voltage set value as an example of a preset target supply power. In this case, it is preferred that each of the control circuits 20A, and 20C make a switch to the high-voltage low-current output mode when the output voltage set value is a first threshold value or more, and make a switch to the low-voltage high-current output mode when the output voltage set value is less than a second threshold value. It should be noted here that the first threshold value may be set to ½ of a maximum output voltage or less, and the second threshold value or more.

Further, each of the control circuits 20A, 20B, and may be formed of an analog circuit or a digital circuit, or a combination thereof. The digital circuit is formed of, for example, a CPU, a DSP, a microcontroller, an FPGA, a CPLD, or other programmable circuit elements, and in any case, can be operated in accordance with an application, for example, a program stored in a storage element. Incidentally, CPU represents Central Processing Unit, and DSP represents Digital Signal Processor. Further, FPGA represents Field Programmable Gate Array, and CPLD represents Complex Programmable Logic Device.

Further, the configurations described in the first to third embodiments described above are not limited to individual application, and may be applied in combination with the configurations of the other embodiments unless a conflict occurs. For example, also with a configuration in which the first to fifth rectifier elements D1 to D5 for the rectifier circuit of the secondary-side circuit in the isolated DC/DC converter circuit 100B according to the second embodiment are replaced by synchronous rectifier elements, equivalent actions and effects can be obtained.

In addition, the configuration described in each of the first to third embodiments described above may be modified to a configuration in which each of the control circuits 20A, and 20C makes a switch between the high-voltage low-current output mode and the low-voltage high-current output mode based on a preset output current set value instead of the output voltage set value. In this case, it is preferred to make a switch to the low-voltage high-current output mode when the output current set value is a third threshold value or more, and make a switch to the high-voltage low-current output mode when the output current set value is less than a fourth threshold value. It should be noted here that the third threshold value may be set to the fourth threshold value or more.

Alternatively, each of the control circuits 20A, 20B, and 20C may compare both of the predetermined output voltage set value and the predetermined output current set value with a predetermined threshold value to determine whether the DC/DC converter circuit is in the high-voltage low-current output mode or the low-voltage high-current output mode. Each of the control circuits 20A, 20B, and 20C may connect the switching circuit in the switching manner to the rectifier circuit when the DC/DC converter circuit is in the low-voltage high-current output mode as a result of the determination, and connect the switching circuit in the switching manner to the current doubler circuit when the DC/DC converter circuit is in the high-voltage low-current output mode.

Meanwhile, in the configuration described above in each of the first to third embodiments, for the semiconductor devices of the inverter circuit 10 of the primary-side circuit, and for the semiconductor devices of the switch elements and the diodes of the secondary-side circuit, a case of using silicon (Si) semiconductor can be exemplified. However, for some or all of the semiconductor devices, a wide-bandgap semiconductor having a wider bandgap than that of silicon (Si) may be used. As the wide-bandgap semiconductor, for example, silicon carbide, gallium nitride-based material, gallium oxide, or diamond is used.

Meanwhile, the configuration described in each of the first to third embodiments may be set so that each of the isolated DC/DC converter circuits 100A, 100B, and 100C performs a regenerative operation. In this case, the rectifier circuit of the secondary-side circuit is replaced by synchronous rectifier elements as described above, and the synchronous rectifier elements are driven to convert the DC power supplied to the output terminals HOT and RTN into the pulse voltage. Then, the converted pulse voltage is transmitted to the inverter circuit 10 of the primary-side circuit via the isolation transformer T to be converted into a direct current, and then the DC power may be returned to the DC power source Vcc. In the case of such a configuration, each of the isolated DC/DC converter circuits 100A, 100B, and 100C is an insulated bidirectional DC/DC converter circuit.

Fourth Embodiment

Between the output terminals HOT and RTN in each of the isolated DC/DC converter circuits 100A, 100B, and 100C according to the embodiments described above, a load to be supplied with DC power is connected. In a fourth embodiment of the present invention, a Hall thruster or other electric thruster is used as such a load. In this case, each the isolated DC/DC converter circuits 100A, 100B, and 100C described in the first to third embodiments can be regarded as an electric propulsion power source.

Then, each of the control circuits 20A, 20B, and 20C may connect the changeover switches S1 and S2 or the changeover switch S3 as the switching circuit to the current doubler circuit during orbit raising of the electric thruster to support the orbit raising in the low-voltage high-current output mode. Further, each of the control circuits 20A, 20B, and 20C may connect the changeover switches S1 and S2 or the changeover switch S3 as the switching circuit to the rectifier circuit during station keeping of the electric thruster to support the station keeping in the high-voltage low-current output mode.

As a result, it is possible to obtain the effects that a reduction in heat generation, downsizing, and the reduction in weight can be achieved while forming the electric propulsion power source capable of achieving high efficiency both in the high-voltage low-current output mode and in the low-voltage high-current output mode with components having small current ratings.

REFERENCE SIGNS LIST 10 inverter circuit, 20A, 20B, 20C, 20D control circuit, 100A, 100B, 100C isolated DC/DC converter circuit, C smoothing capacitor, D1 to D5 rectifier element, HOT, RTN output terminal, L1, L2 smoothing inductor, Q1 to Q4 synchronous rectifier element, Vcc DC power source, S1, S2, S3 changeover switch, T isolation transformer

The invention claimed is:

1. A DC/DC converter circuit, comprising:
a primary-side circuit configured to convert DC power from a DC power source into a pulse voltage;
an isolation transformer configured to transform the pulse voltage while isolating the pulse voltage;
a secondary-side circuit connectable in a switching manner by a switching circuit to one of a rectifier circuit for a high-voltage low-current output mode or a current doubler circuit for a low-voltage high-current output mode; and
a control circuit configured to perform connection switching control of the switching circuit so as to establish, depending on target supply power, connection to the rectifier circuit in the high-voltage low-current output mode, and connection to the current doubler circuit in the low-voltage high-current output mode,
wherein the control circuit is configured to determine that the DC/DC converter circuit is in the high-voltage low-current output mode and connect the switching circuit in the switching manner to the rectifier circuit when the target supply power is equal to or higher than ½ of a maximum output voltage, and determine that the DC/DC converter circuit is in the low-voltage high-current output mode and connect the switching circuit in the switching manner to the current doubler circuit when the target supply power is lower than ½ of the maximum output voltage.

2. The DC/DC converter circuit according to claim 1,
wherein the isolation transformer has a primary winding connected to an output terminal of the primary-side circuit, and a secondary winding connected to the rectifier circuit;
wherein the rectifier circuit includes a plurality of output terminals and a plurality of rectifier elements,
wherein the current doubler circuit includes a plurality of inductors connected to the rectifier circuit,
wherein the secondary-side circuit includes the switching circuit configured to switch a connection relationship between at least one of the plurality of inductors and the plurality of output terminals in the rectifier circuit, and
wherein the control circuit is configured to control the primary-side circuit and the switching circuit.

3. The DC/DC converter circuit according to claim 2,
wherein the rectifier circuit includes, as the plurality of rectifier elements, a first rectifier element, a second rectifier element, a third rectifier element, a fourth rectifier element, and a fifth rectifier element,
wherein the secondary winding of the isolation transformer has a first terminal connected to a first terminal of the first rectifier element and a second terminal of the second rectifier element, and the secondary winding has a second terminal connected to a first terminal of the third rectifier element, a second terminal of the fourth rectifier element, and a first terminal of the fifth rectifier element,
wherein the switching circuit is connected between a second terminal of the first rectifier element and a second terminal of the fifth rectifier element,
wherein the second terminal of the first rectifier element is connected to one terminal of a first inductor,
wherein the third rectifier element has a second terminal connected to one terminal of a second inductor,
wherein the first inductor and the second inductor each have the other terminal connected to one terminal of a capacitor and a first output terminal, and
wherein the second rectifier element and the fourth rectifier element each have a first terminal connected to the other terminal of the capacitor and a second output terminal.

4. The DC/DC converter circuit according to claim 2, wherein the plurality of rectifier elements are each equivalently formed of a diode and a transistor connected in parallel to each other, and are controlled by the control circuit.

5. The DC/DC converter circuit according to claim 2, wherein, for one or both of a semiconductor of the primary-side circuit and a semiconductor of the plurality of rectifier elements of the rectifier circuit in the secondary-side circuit, a wide-bandgap semiconductor is used.

6. A DC/DC converter circuit, comprising:
a primary-side circuit configured to convert DC power from a DC power source into a pulse voltage;
an isolation transformer configured to transform the pulse voltage while isolating the pulse voltage;
a secondary-side circuit connectable in a switching manner by a switching circuit to one of a rectifier circuit for a high-voltage low-current output mode or a current doubler circuit for a low-voltage high-current output mode; and
a control circuit configured to perform connection switching control of the switching circuit so as to establish, depending on target supply power, connection to the rectifier circuit in the high-voltage low-current output mode, and connection to the current doubler circuit in the low-voltage high-current output mode, wherein the control circuit is configured to, as a result of comparing one or both of a predetermined output voltage set value and a predetermined output current set value as the target supply power to a predetermined threshold value to determine whether the DC/DC converter circuit is in the high-voltage low-current output mode or in the low-voltage high-current output mode, connect the switching circuit to the rectifier circuit when the DC/DC converter circuit is in the high-voltage low-current output mode, and connect the switching circuit to the current doubler circuit when the DC/DC converter circuit is in the low-voltage high-current output mode.

7. A DC/DC converter circuit, comprising:
a primary-side circuit configured to convert DC power from a DC power source into a pulse voltage;
an isolation transformer configured to transform the pulse voltage while isolating the pulse voltage;
a secondary-side circuit connectable in a switching manner by a switching circuit to one of a rectifier circuit for a high-voltage low-current output mode or a current doubler circuit for a low-voltage high-current output mode; and
a control circuit configured to perform connection switching control of the switching circuit so as to establish, depending on target supply power, connection to the rectifier circuit in the high-voltage low-current output mode, and connection to the current doubler circuit in the low-voltage high-current output mode,
wherein the isolation transformer has a primary winding connected to an output terminal of the primary-side circuit, and a secondary winding connected to the rectifier circuit,
wherein the rectifier circuit includes a plurality of output terminals and a plurality of rectifier elements,
wherein the current doubler circuit includes a plurality of inductors connected to the rectifier circuit,
wherein the secondary-side circuit includes the switching circuit configured to switch a connection relationship between at least one of the plurality of inductors and the plurality of output terminals in the rectifier circuit,
wherein the control circuit is configured to control the primary-side circuit and the switching circuit,
wherein the rectifier circuit includes, as the plurality of rectifier elements, a first rectifier element, a second rectifier element, a third rectifier element, and a fourth rectifier element,
wherein the switching circuit includes a first circuit and a second circuit,
wherein the secondary winding of the isolation transformer has a first terminal connected to a first terminal of the first rectifier element, a second terminal of the second rectifier element, and a first contact of the second circuit, and the secondary winding has a second terminal connected to a first terminal of the third rectifier element, a second terminal of the fourth rectifier element, and a first contact of the first circuit,
wherein the first rectifier element and the third rectifier element each have a second terminal connected to a second contact of the second circuit,
wherein the first circuit has a common terminal connected to one terminal of a second inductor,
wherein the second circuit has a common terminal connected to one terminal of a first inductor,
wherein the first inductor and the second inductor each have the other terminal connected to one terminal of a capacitor and a first output terminal, and
wherein the second rectifier element and the fourth rectifier element each have a first terminal connected to the other terminal of the capacitor and a second output terminal.

8. An electric propulsion power source, comprising, as an electric thruster, a load to be connected between the first output terminal and the second output terminal of the DC/DC converter circuit of claim 7.

9. The electric propulsion power source according to claim 8, wherein the control circuit is configured to connect the switching circuit to the current doubler circuit during orbit raising of the electric thruster to support the orbit raising in the low-voltage high-current output mode, and connect the switching circuit to the rectifier circuit during station keeping of the electric thruster to support the station keeping in the high-voltage low-current output mode.

\* \* \* \* \*